US012610118B2

(12) United States Patent
Nandyala et al.

(10) Patent No.: US 12,610,118 B2
(45) Date of Patent: Apr. 21, 2026

(54) CAMERA DEVICE FOR A VEHICLE, VEHICLE AND METHOD FOR MANUFACTURING A CAMERA DEVICE

(71) Applicant: VALEO SCHALTER UND SENSOREN GMBH, Bietigheim-Bissingen (DE)

(72) Inventors: Chakrapani Nandyala, Bietigheim-Bissingen (DE); Santhosh Kumar Panneerselvam, Bietigheim-Bissingen (DE)

(73) Assignee: Valeo Schalter und Sensoren GmbH, Beitigheim-Bissingen (DE)

( * ) Notice: Subject to any disclaimer, the term of this patent is extended or adjusted under 35 U.S.C. 154(b) by 122 days.

(21) Appl. No.: 18/573,151

(22) PCT Filed: Jun. 20, 2022

(86) PCT No.: PCT/EP2022/066682
§ 371 (c)(1),
(2) Date: Dec. 21, 2023

(87) PCT Pub. No.: WO2022/268685
PCT Pub. Date: Dec. 29, 2022

(65) Prior Publication Data
US 2024/0298083 A1 Sep. 5, 2024

(30) Foreign Application Priority Data
Jun. 24, 2021 (DE) ..................... 10 2021 116 319.6

(51) Int. Cl.
*H04N 23/54* (2023.01)
*H04N 23/52* (2023.01)

(52) U.S. Cl.
CPC ............. *H04N 23/54* (2023.01); *H04N 23/52* (2023.01)

(58) Field of Classification Search
CPC ............................... H04N 23/54; H04N 23/52
See application file for complete search history.

(56) References Cited

U.S. PATENT DOCUMENTS

| | | | |
|---|---|---|---|
| 6,063,999 | A | 5/2000 | Kelly |
| 6,219,258 | B1 | 4/2001 | Denzene et al. |

(Continued)

FOREIGN PATENT DOCUMENTS

| | | |
|---|---|---|
| CN | 110891361 A | 3/2020 |
| DE | 10231145 A1 | 1/2004 |

(Continued)

OTHER PUBLICATIONS

International Search Report and Written Opinion in corresponding International Application No. PCT/EP2022/066682, dated Oct. 20, 2022 (11 pages).

(Continued)

*Primary Examiner* — Padma Haliyur
(74) *Attorney, Agent, or Firm* — Osha Bergman Watanabe & Burton LLP

(57) ABSTRACT

A camera device for a vehicle is disclosed. The camera device includes a printed circuit board extending in a main plane, one or more electronic components mounted on a surface of the printed circuit board, an electrically conductive housing accommodating the printed circuit board, and electrically conductive elements for shielding the one or more electronic components from electromagnetic interference. The housing includes a wall extending perpendicularly to the main plate of the printed circuit board and surrounding the one or more electronic components. The electrically conductive elements are surface mounted on the printed circuit board such that they surround the one or more electronic components surround the one or more electronic (Continued)

components, and are compressed elastically between the wall and the printed circuit board.

10 Claims, 5 Drawing Sheets

(56) References Cited

U.S. PATENT DOCUMENTS

| | | | | |
|---|---|---|---|---|
| 6,269,008 | B1 | 7/2001 | Hsu | |
| 7,129,421 | B2 | 10/2006 | Reis et al. | |
| 7,443,693 | B2 | 10/2008 | Arnold et al. | |
| 2003/0016519 | A1 | 1/2003 | Bachman | |
| 2004/0216910 | A1* | 11/2004 | Reis ..................... | H05K 9/0015 |
| | | | | 174/370 |
| 2011/0080515 | A1 | 4/2011 | Kang | |
| 2011/0155445 | A1 | 6/2011 | Kwon et al. | |
| 2013/0208435 | A1 | 8/2013 | Hederoth | |
| 2014/0268583 | A1 | 9/2014 | Ding | |
| 2018/0287306 | A1* | 10/2018 | Grimes ................ | H05K 9/0058 |
| 2019/0143907 | A1* | 5/2019 | Byrne .................. | H01R 12/716 |
| | | | | 348/148 |
| 2019/0174623 | A1* | 6/2019 | Owaki .................... | H04N 23/52 |
| 2020/0064559 | A1* | 2/2020 | Kim ..................... | H01R 12/722 |
| 2020/0169648 | A1* | 5/2020 | Percival ................. | H04N 23/51 |
| 2020/0245462 | A1 | 7/2020 | Kim et al. | |
| 2021/0014994 | A1* | 1/2021 | Fujiwara ............... | H04N 23/52 |
| 2021/0127532 | A1* | 4/2021 | Persson ................. | H04N 23/57 |
| 2022/0095448 | A1* | 3/2022 | Niu ........................ | H05K 1/181 |
| 2022/0174191 | A1* | 6/2022 | Niu ........................ | H04N 23/54 |

FOREIGN PATENT DOCUMENTS

| | | | |
|---|---|---|---|
| DE | 69817220 | T2 | 6/2004 |
| DE | 102014115296 | A1 | 4/2016 |
| DE | 102015110262 | A1 | 12/2016 |
| DE | 212019000256 | U1 | 12/2020 |
| JP | S62-138496 | A | 6/1987 |
| JP | 2001-111282 | A | 4/2001 |
| JP | 2001-187968 | A | 7/2001 |
| JP | 2004-072051 | A | 3/2004 |
| JP | 2014011565 | A | 1/2014 |
| JP | 2018-164189 | A | 10/2018 |
| JP | 2020-191520 | A | 11/2020 |
| KR | 101658821 | B1 | 10/2016 |
| WO | 2021-099443 | A1 | 5/2021 |

OTHER PUBLICATIONS

German Search Report in corresponding German Application No. 10 2021 116 3196, dated Mar. 9, 2022 (5 pages).

Office Action issued in counterpart Japanese Patent Application No. 2023-579386 mailed Nov. 1, 2024 (13 pages).

Office Action issued in counterpart Japanese Patent Application No. 2023-579386, dated Apr. 18, 2025 (15 pages).

Indian Office Action in corresponding Indian Application No. 202317086417, dated Nov. 19, 2025 (7 pages).

* cited by examiner

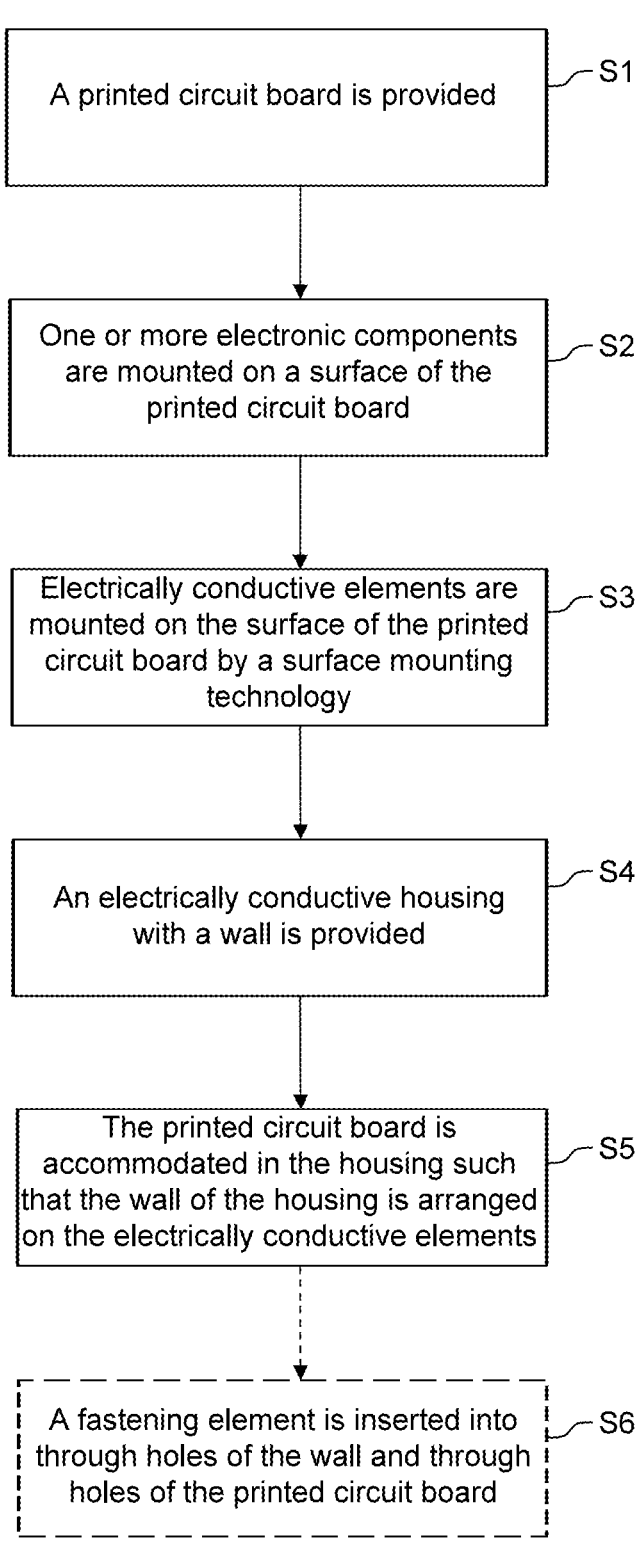

A printed circuit board is provided — S1

One or more electronic components are mounted on a surface of the printed circuit board — S2

Electrically conductive elements are mounted on the surface of the printed circuit board by a surface mounting technology — S3

An electrically conductive housing with a wall is provided — S4

The printed circuit board is accommodated in the housing such that the wall of the housing is arranged on the electrically conductive elements — S5

A fastening element is inserted into through holes of the wall and through holes of the printed circuit board — S6

FIG. 10

CAMERA DEVICE FOR A VEHICLE, VEHICLE AND METHOD FOR MANUFACTURING A CAMERA DEVICE

The invention relates to a camera device for a vehicle, a vehicle with such a camera device and a method for manufacturing the camera device.

A camera device of a vehicle comprises several electronic components such as an image sensor, an image processor, a microcontroller, memory and the like. Electromagnetic radiation from electronic components can disturb surrounding electronic components and devices. Therefore, an effective shielding against electromagnetic interference between different electronic components of the camera device and between electronic components of the camera device and external devices is desired.

In US 2003/016519 A1, an electromagnetic interference shield is provided by a conforming shield enclosure. A flexible, metalized thermo-formable polymer having dimensions conforming to the inside of a housing of a semiconductor device is applied directly on a wall of the housing. The housing with the applied polymer is then enclosing and thereby shields the semiconductor device from electromagnetic radiation. However, manufacturing the housing with the thermo-formable adhesive polymer is an expensive process.

An objective of the present invention is to provide an improved camera device for a vehicle.

Accordingly, a camera device for a vehicle is provided. The camera device comprises:

a printed circuit board extending in a main plane, one or more electronic components mounted on a surface of the printed circuit board, an electrically conductive housing accommodating the printed circuit board, the housing comprising a wall extending perpendicularly to the main plane of the printed circuit board and surrounding the one or more electronic components, and electrically conductive elements for shielding the one or more electronic components from electromagnetic interference, wherein the electrically conductive elements are:

surface-mounted on the surface of the printed circuit board such that they surround the one or more electronic components, and compressed elastically between the wall and the printed circuit board.

The electrically conductive wall of the housing and the electrically conductive elements act together to provide a (local) electromagnetic interference shield (EMI shield) for the one or more electronic components. Thus, a shield against electromagnetic radiation, e.g. at radio frequency and/or microwave frequency, entering or escaping the shielded area is provided. Hence, electromagnetic radiation generated by the one or more electronic components enclosed by the shield can be prevented from disturbing other electronic components on the same printed circuit board, other electronic components of the camera device and/or other electronic equipment in the vehicle. Furthermore, the one or more electronic components enclosed by the shield can also be protected against electromagnetic radiation coming from the outside.

The electrically conductive elements are configured as surface mountable devices (SMD). They can thus be easily mounted on the printed circuit board. Further, they can be easily connected to an electrical ground potential of the printed circuit board. In particular, the electrically conductive elements can be mounted by a standard surface mount technology (SMT). In particular, they can be mounted on the printed circuit board in a fully automatic manner. For example, the electrically conductive elements can be tape-and-reel-fed components that are mounted on the printed circuit board by using, for example, a vacuum head on the end of a high-speed pick-and-place system. For example, the electrically conductive elements can be mounted on the printed circuit board together with the electronic components by using the same machine and/or within the same or a subsequent manufacturing step. In particular, the electrically conductive elements can be soldered onto surface-mount pads on the printed circuit board. They can, for example, be soldered onto the printed circuit board by reflow-soldering. Reflow-soldering involves heating and melting a previously provided soldering pad on the printed circuit board by applying, for example, infrared radiation, laser radiation or a gas, and connecting the SMD with the melted pad.

The electrically conductive elements being elastically deformable allows to improve the electrical contact between the electrically conductive camera housing and the printed circuit board (e.g., a ground trace of the printed circuit board). Thus, uneven mating surfaces due to mechanical tolerances and bending can be compensated by the elastically deformable electrically conductive elements and a leakage of electromagnetic radiation can be reduced. Further, also in the case of mechanical stress (e.g. flexure) a reliable electric contact between the electrically conductive camera housing and the printed circuit board (e.g., a ground trace of the printed circuit board) can be provided.

The electrically conductive elements are, in particular elastically deformable in a direction perpendicular to the main plane of the printed circuit board.

The housing comprises, for example, side walls extending substantially in a perpendicular direction with respect to the main plane of the printed circuit board. The printed circuit board is, for example, fully accommodated between the side walls of the housing. The side walls of the housing may be electrically connected to a ground potential of the printed circuit board and act as a global electromagnetic interference shield of the whole printed circuit board, i.e. for all electronic components on the printed circuit board. Further, the claimed wall is, for example, provided in addition to said side walls and is acting together with the electrically conductive elements to provide a local (i.e. second) electromagnetic interference shield for the one or more electronic components surrounded by the claimed wall and the electrically conductive elements.

The wall acting together with the electrically conductive SMD-elements comprises, for example, a contact surface for contacting the electrically conductive elements. The contact surface is, in particular, arranged parallel to the main plane of the printed circuit board. The contact surface is, in particular, the face side of the perpendicularly to the main plane extending wall. The wall is, for example, integrally formed with the housing. The wall is, for example, a circumferential wall.

The camera device is, in particular, applied in a vehicle such as a motor vehicle. The vehicle is, for example, a passenger vehicle, a car, bus, sport utility vehicle, truck, train, watercraft and/or airplane. The camera device can also be employed in a vehicle which allows autonomous or semi-autonomous driving.

The camera device is, for example, configured for electronic connection with a central electronic control unit (ECU) of the vehicle.

The camera device is, for example, arranged at an interior side of a window of the vehicle such as a windscreen (front window) or a back window of the vehicle. If the camera device is arranged at the interior side of the windscreen (front window), it is called a front camera. However, the camera device can also be arranged at a different window of the vehicle.

In embodiments, the housing comprises a first part and a second part, and the first part comprises the wall.

According to an embodiment, one, several or all of the electrically conductive elements comprise an electrically conductive and elastically deformable gasket portion in contact with the wall and an electrically conductive mounting portion mounted on the surface of the printed circuit board.

The gasket portion can be compressed between the wall and the mounting portion mounted on the printed circuit board to provide a good mechanical and, thus, electrical contact between the housing and a ground trace of the printed circuit board.

The mounting portion includes, for example, a solderable shim. The mounting portion and the gasket portion are, for example, attached to each other by mechanical means, such as a crimp, or by an adhesive.

In embodiments, the gasket portion comprises an interior hole for increasing the compressibility of the gasket portion. The hole is, for example, a through hole extending parallel to the main plane of the printed circuit board.

According to a further embodiment, the gasket portion comprises an elastomeric inner core and an electrically conductive outer layer.

The elastomeric inner core comprises, for example, a high temperature elastomeric material to withstand soldering temperatures. The elastomeric material comprises, for example, silicone, fluorocarbon, fluorosilicone etc. The elastomeric inner core may also comprise another kind of elastomeric material.

The electrically conductive outer layer comprises metal such as copper, gold, silver and/or tin etc. For example, the electrically conductive outer layer comprises a base material such as plastic or metal (e.g., copper or brass) plated with a highly conductive metal layer such as gold, silver or tin etc.

In another example, the gasket portion may comprise, for example, an electrically conductive gasket material. The electrically conductive gasket material comprises, for example, electrically conductive particles in an elastomeric binder, i.e. a mixture of electrically conductive particles and an elastomeric material. The mixture is, for example, provided in form of a paste, dispersion or powder which is used to form the gasket portion. The electrically conductive gasket material comprises, for example, an electrically conductive polymer matrix, an electrically conductive polytetrafluoroethylene (PTFE), a particle-filled foam or the like.

According to a further embodiment, one, several or all of the electrically conductive elements comprise a spring element in contact with the wall and an electrically conductive mounting portion mounted on the surface of the printed circuit board.

The spring element can be compressed between the wall and the mounting portion mounted on the printed circuit board to provide—by means of the spring force—a good mechanical and, thus, electrical contact between the housing and a ground trace of the printed circuit board.

According to a further embodiment, the camera device comprises an imaging module for providing image data of a surrounding of the vehicle. Further, the one or more electronic components comprise an image processor unit for processing the image data provided by the imaging module, a memory unit for storing the image data and/or a communication bus for transferring the image data between the image processor unit and the memory unit.

Depending on the position of the camera device and the imaging module in the vehicle different monitoring areas in the front, in the back and/or at the sides of the vehicle can be monitored. In particular, by using the imaging module objects at rest or moving objects can be detected, such as other vehicles, people, animals, plants, obstacles, a road unevenness (e.g., potholes or stones), lane markings, traffic signs or free spaces (e.g., parking spaces).

The imaging module of the camera device comprises, in particular, an optical system which includes, for example, an objective, a lens or the like. Further, the imaging module comprises an image sensor unit which includes, for example, a CCD camera (Charged Coupled Device) or a CMOS sensor (Complementary Metal-Oxide Semiconductor-Sensor). The imaging module is, for example, configured to take high-resolution images of the surrounding of the vehicle. The image sensor unit of the imaging module may be mounted on the printed circuit board. Alternatively, the camera device may include another separate printed circuit board arranged intersecting the optical axis of the optical system of the imaging module and comprising the image sensor unit.

The image processor unit is, in particular, realized as an electronic hardware component mounted on the printed circuit board. The image processor unit is, in particular, configured for analyzing and interpreting image data obtained by the imaging module. The image processor unit includes, for example, a video processor. The image processor unit includes, for example, a graphic processor. The image processor unit includes, for example, a high speed processor with a clock rate of 1 GHz or larger, 2 GHz or larger, 3 GHZ or larger, 4 GHz or larger, 5 GHz or larger and/or 10 GHz or larger.

The memory unit is, in particular, realized by an electronic hardware component mounted on the printed circuit board.

According to a further embodiment, the housing comprises a first part and a second part, the first part comprises the wall, the wall comprises at least one through hole extending perpendicularly to the main plane of the printed circuit board, and the camera device comprises one or more electrically conductive fastening elements mechanically fixing the first and second parts of the housing to each other. Furthermore, at least one of the one or more fastening elements is penetrating a corresponding one of the at least one through hole of the wall and a corresponding through hole of the printed circuit board and is functioning as an additional electrically conductive element for shielding the one or more electronic components from electromagnetic interference.

Thus, by using (some of) the fastening elements, which are required to fix the first and second housing parts along with the printed circuit board to each other, also as an additional electrically conductive element for shielding the one or more electronic components from electromagnetic interference, the manufacture of the camera device can be simplified. In particular, a smaller number of electrically conductive elements as SMD-components are required.

The fastening elements are, for example, screws. The fastening elements comprise, for example, a threaded portion. Corresponding openings of the housing, e.g., of the second part of the housing, comprise, for example, a mating threaded portion.

According to a further embodiment, the electrically conductive elements are arranged intermittent on the surface of the printed circuit board.

Thus, the number of electrically conductive elements can be reduced. Further, the electrically conductive elements can be easily mounted on the printed circuit board.

For example, a size of a gap between each of two neighboring electrically conductive elements is configured such that a high shielding effectiveness is achieved in the 2G band, in the 3G band and/or in the 5G band. This allows a good electromagnetic shielding performance especially for cameras mounted on the front windshield, where mostly 2G, 3G, 5G and other antennas are mounted in close proximity to the camera.

According to a further embodiment, a size of a gap between each of two neighboring electrically conductive elements is 3 cm or smaller, 1.5 cm or smaller, 1 cm or smaller, 0.5 cm or smaller and/or 0.3 cm or smaller, and/or a size of a gap between each pair of an electrically conductive element and a neighboring additional electrically conductive element is 3 cm or smaller, 1.5 cm or smaller, 1 cm or smaller, 0.5 cm or smaller and/or 0.3 cm or smaller.

With gaps having a size of 3 cm or smaller electromagnetic radiation with a frequency of 1 GHz and below can be efficiently shielded. With gaps of 1.5 cm or smaller electromagnetic radiation with a frequency of 2 GHz and below can be efficiently shielded. With gaps of 1 cm or smaller electromagnetic radiation with a frequency of 3 GHZ and below can be efficiently shielded. With gaps of 0.5 cm or smaller electromagnetic radiation with a frequency of 6 GHZ and below can be efficiently shielded. With gaps of 0.3 cm or smaller electromagnetic radiation with a frequency of 10 GHz and below can be efficiently shielded.

For example, to efficiently shield electromagnetic radiation of a processor with a clock rate of 1.2 GHz a gap of 0.5 cm is required as the processor generates in addition to an electromagnetic radiation with a frequency of 1.2 GHz a prominent harmonic at 3.6 GHz which is in the 5G band.

According to a further embodiment, the total number of the electrically conductive elements surrounding the one or more electronic components is four, six, eight, ten, sixteen or more, and/or the total number of the electrically conductive elements and the additional electrically conductive elements surrounding together the one or more electronic components is four, six, eight, ten, sixteen or more.

Having a larger number of electrically conductive elements allows to realize smaller gap sizes by using the same kind of electrically conductive elements. Hence, high frequency electromagnetic radiation can be blocked.

According to a further aspect, a vehicle comprising the above described camera device is provided.

According to a further aspect, a method for manufacturing a camera device for a vehicle is proposed. The method comprising the steps:

providing a printed circuit board extending in a main plane,
  mounting one or more electronic components on a surface of the printed circuit board,
  mounting electrically conductive elements on the surface of the printed circuit board by a surface mounting technology and such that they surround the one or more electronic components,
  providing an electrically conductive housing with a wall configured for extending, in the assembled state of the camera device, perpendicularly to the main plane of the printed circuit board, and accommodating the printed circuit board in the housing such that the wall of the housing is arranged on the electrically conductive elements and the electrically conductive elements are compressed elastically between the wall and the printed circuit board.

Features described in conjunction with the camera device equally apply to the vehicle or the method according to the further aspects and vice versa.

The above described units, such as the image processor unit, the memory unit and the communication bus, are implemented, in particular, in hardware. The corresponding unit can be designed as a device or as part of a device, for example as a computer or as a microprocessor. For example, the device may include a central processing unit (CPU), a graphical processing unit (GPU), programmable hardware logic (e.g., a field programmable gate array, FPGA), an application-specific integrated circuit (ASIC), or the like. Further, the one or more units may be implemented together in a single hardware device, and they may share, for example, interfaces and the like. The units may also be implemented in separate hardware devices.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

Further embodiments, features and advantages of the present invention will become apparent from the dependent claims and the subsequent description of the embodiments.

In the following, the invention will be described in detail based on preferred embodiments with reference to the following figures.

FIG. 10 shows a flow chart of a method for manufacturing the camera device of FIG. 2 or 8.

In the figures, like reference numerals designate like or functionally equivalent elements, unless otherwise indicated.

Figure 1:
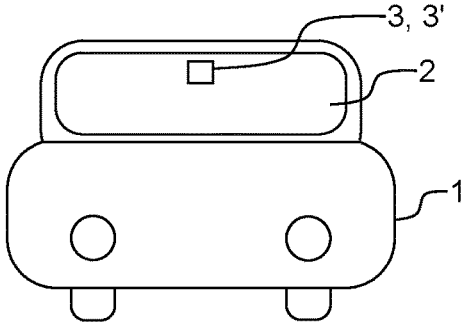
FIG. 1 shows a front view of a vehicle.

FIG. 1 shows a front view of a vehicle 1. The vehicle 1 in this example is a passenger vehicle. In other examples, the vehicle 1 may also be a truck, bus or another motor vehicle. A camera device 3 (front camera) is attached to an interior side of a front windscreen 2 of the vehicle 1. The camera device 3 is, for example, attached—as seen from the driver-behind or near a rear-view mirror (not shown) of the vehicle 1.

Figure 2:
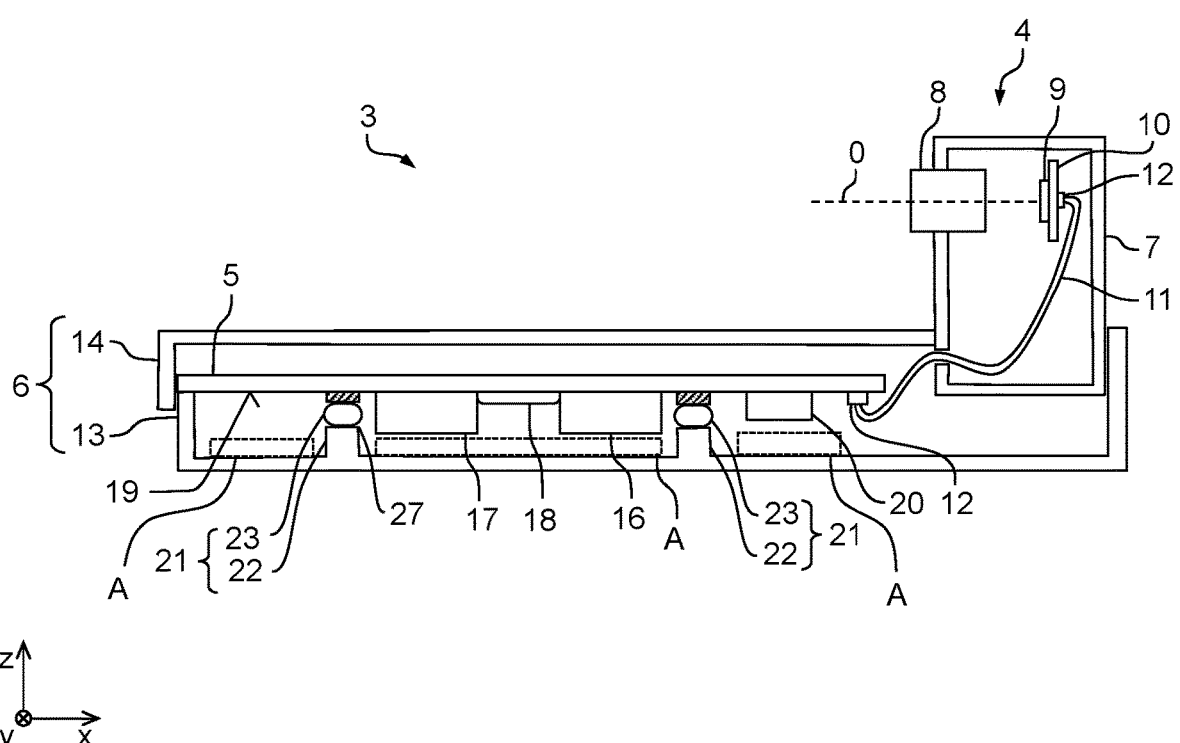
FIG. 2 shows, in a cross-section view, a camera device of the vehicle of FIG. 1 according to a first embodiment.

FIG. 2 shows a cross-section view of the camera device 3.

The camera device 3 includes an imaging module 4 which is configured for monitoring an area in front of the vehicle 1. The imaging module 4 can be used for several driver assistance functions such as object detection, adaptive cruise control, lane keep assist, automatic emergency braking, automatic (emergency) steering, traffic jam assist, high beam assist, highway assist and/or traffic jam pilot. In other examples, the camera device 3 may also be attached at other windows or positions of the vehicle 1 and/or may be directed towards other directions.

The camera device 3 comprises a main printed circuit board 5 accommodated in an electrically conductive housing 6.

The camera device 3 may further comprise an imaging module housing 7. The imaging module housing 7 is, for example, made of plastic. The imaging module housing 7 is, for example, attached to the electrically conductive housing 6 by means of fastening elements (not shown).

The camera device 3 may further include, for example, a bracket and/or a cover (not shown) for attaching (e.g., adhering) the camera device 3 at the windscreen 2 (FIG. 1).

The imaging module 4 is accommodated in the imaging module housing 7. The imaging module 4 comprises an optical system 8 (e.g., an objective 8) protruding from the imaging module housing 7. Reference sign O denotes an optical axis of the optical system 8. Further, the imaging module 4 comprises an image sensor unit 9. The image sensor unit 9 is, for example, a CCD camera (Charged Coupled Device) or a CMOS sensor. For example, the image sensor unit 9 is an active pixel sensor based on CMOS technology (CMOS-APS, CMOS active pixel sensor). The imaging module 4 is, for example, configured to take high-resolution images of the surrounding of the vehicle 1.

In the shown example, the image sensor unit 9 is mounted on a separate printed circuit board 10. The separate printed circuit board 10 and the main printed circuit board 5 are electronically connected, for example, by means of an electronic cable 11 and connectors 12. The optical system 8 (e.g., the objective 8) is, for example, mechanically attached to the separate printed circuit board 10 by means of an objective mount (not shown). In other examples, the printed circuit board 5 may be arranged intersecting the optical axis O of the optical system 8, and the image sensor unit 9 may be arranged on the printed circuit board 5. In this case, no separate printed circuit board 10 would be required.

Figure 3:
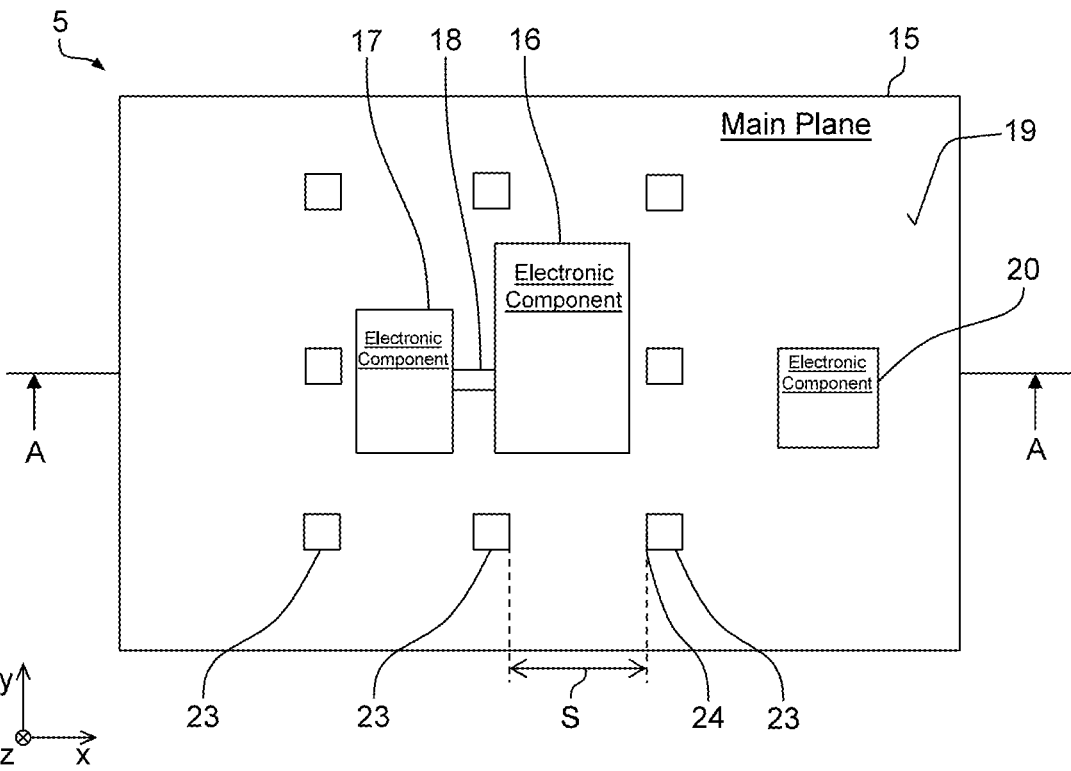
FIG. 3 shows a printed circuit board of the camera device of FIG. 2 in a bottom view.

FIG. 3 shows a bottom view of the printed circuit board 5 of FIG. 2. In particular, FIG. 2 is a cross-section view taken along line AA in FIG. 3. The printed circuit board 5 is extending in a main plane 15 (FIG. 3). The main plane 15 is an XY-plane (FIGS. 2 and 3).

The camera device 3 comprises one or more electronic components 16, 17, 18 mounted on a surface 19 of the printed circuit board 5. In the shown example, the one or more electronic components 16, 17, 18 comprise an image processor unit 16 for processing image data provided by the imaging module 4, a memory unit 17 for storing the image data and a communication bus 18 for transferring the image data and possibly other data between the image processor unit 16 and the memory unit 17.

In order to shield the electronic components 16, 17, 18 with respect to electromagnetic interference (EMI) from other electronic components 20 mounted on the printed circuit board 5 or from other electronic equipment (not shown) of the vehicle 1, the camera device 3 includes a local EMI shield 21 (FIG. 2). The local EMI shield 21 comprises a wall 22 and elastically deformable and electrically conductive elements 23 compressed between the wall 22 and the printed circuit board 5.

In the example of FIGS. 2 and 3, the camera device 3 comprises eight electrically conductive elements 23 (three of them have been denoted with a reference sign in FIG. 3) surrounding the electronic components 16, 17, 18. The electrically conductive elements 23 are arranged intermittent on the printed circuit board 5 with a gap 24 between each of two neighboring electrically conductive elements 23 (one of the eight gaps 24 has been denoted with a reference sign in FIG. 3). The frequency range of the electromagnetic radiation that can be efficiently blocked by the EMI shield 21 depends on a size S of the gaps 24. The smaller the size S of the gaps 24 the larger is the maximum frequency that can be blocked by the EMI shield 21. For example, to efficiently shield electromagnetic radiation with frequencies of 6 GHz and below, the size S of the gaps 24 should be 0.5 cm at maximum. In other examples, also another number of electrically conductive elements 23 can be applied. Further, also the size S of the gaps 24 can have a different value.

The electrically conductive elements 23 are, in particular, surface mountable devices (SMD). The electrically conductive elements 23 are connected to a ground potential such as a ground trace (not shown) of the printed circuit board 5.

As shown in FIG. 2, the electrically conductive housing 6 accommodating the printed circuit board 5 comprises a first part 13 and a second part 14. The first part 13 comprises the wall 22. The wall 22 is, for example, integrally formed with the first part 13 of the housing 6. The wall 22 is extending perpendicularly to the main plane 15 (the XY-plane in FIG. 2) of the printed circuit board 5. In other words, the wall 22 is extending in the Z-direction in FIG. 2.

Figure 4:
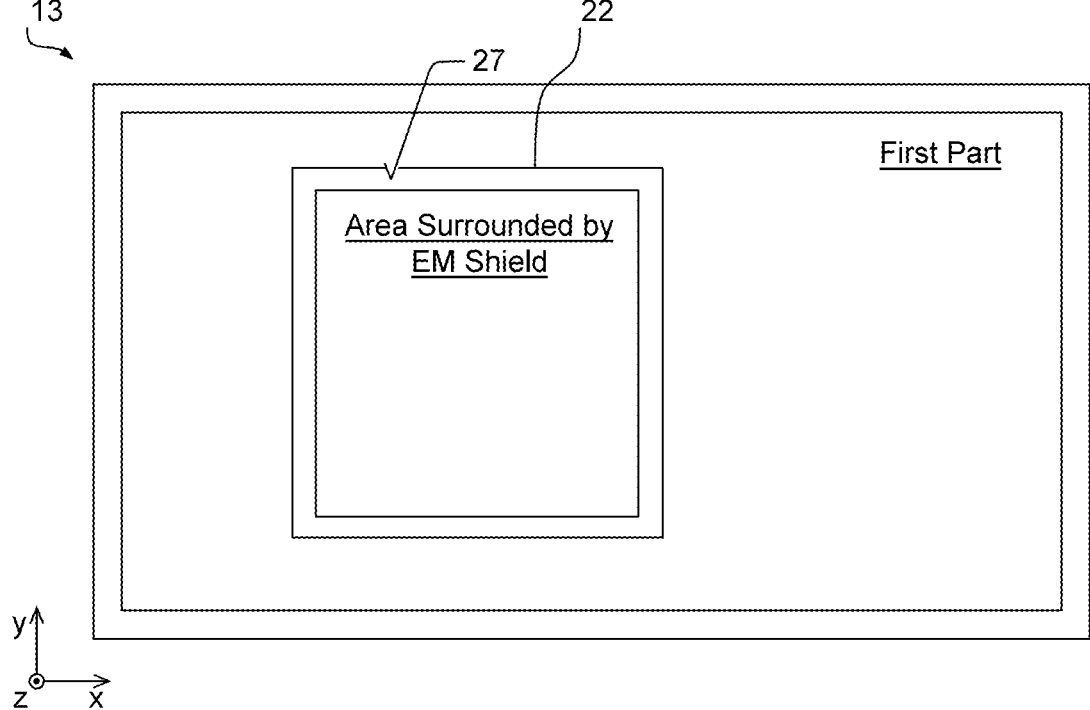
FIG. 4 shows a first part of a housing of the camera device of FIG. 2 in a plan view.

FIG. 4 shows a plan view of the first part 13 of the housing 6. As can be seen in FIG. 4, the wall 22 is a circumferential wall 22 surrounding, in the assembled state of the camera device 3, the electronic components 16, 17, 18 (FIG. 2).

Figure 5:
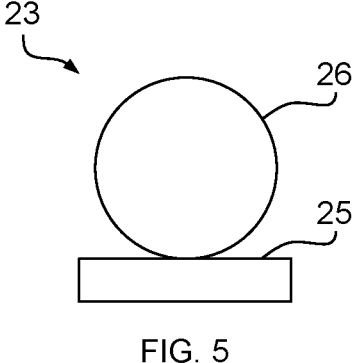
FIG. 5 shows an electrically conductive element of the camera device of FIG. 2 according to an embodiment.

FIG. 5 shows an embodiment of one of the electrically conductive elements 23 of the EMI shield 21 (FIG. 2) in an uncompressed state. The electrically conductive element 23 comprises an electrically conductive mounting portion 25 for mounting the electrically conductive element 23 by a surface mounting technology (SMT) to the surface 19 (FIG. 2) of the printed circuit board 5. The electrically conductive mounting portion 25 is, for example, a solderable shim. Further, the electrically conductive element 23 comprises a gasket portion 26 for contacting the wall 22 (FIG. 2). The gasket portion 26 is electrically conductive for providing an electrical connection to the wall 22, in particular to a face side 27 (FIGS. 2 and 4) of the wall 22. Further, the gasket portion 26 is elastically deformable for providing a good mechanical (and, thus, electrical contact) to the wall 22, in particular to the face side 27 of the wall 22 (FIG. 2 shows the electrically conductive elements 23, i.e. their gasket portions 26 in a compressed state). In the embodiment of FIG. 5, the gasket portion 26 comprises an electrically conductive elastomeric material such as a material made by mixing conductive particles into an elastomeric binder.

As shown in FIG. 2 with dashed lines and denoted with a reference sign A, the electrically conductive housing 6 may comprise one or more protruding portions A. The protruding portions A protrude, in particular, from the first part 13 of the electrically conductive housing 6 towards the printed circuit board 5. The protruding portions A may also contact one or more of the electronic components 16, 17, 18 on the printed circuit board 5. The protruding portions A provide a further shield against electromagnetic leakage. The protruding portions A may, for example, be integrally formed with the first part 13 of the housing 6.

Figures 6, 7:
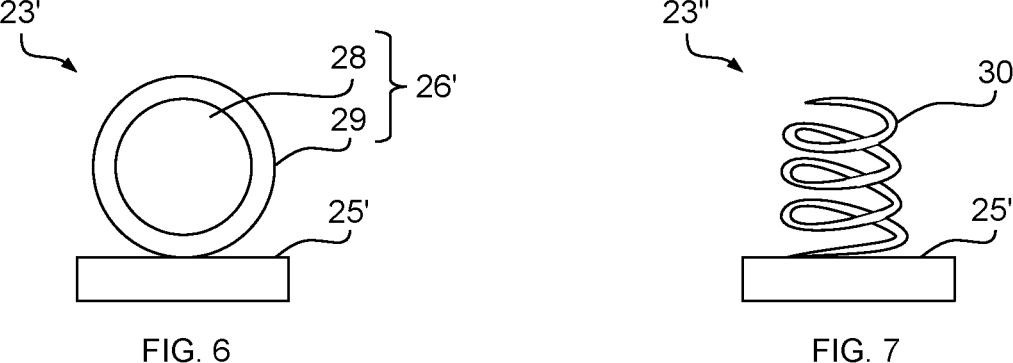
FIG. 6 shows an electrically conductive element of the camera device of FIG. 2 according to a further embodiment.
FIG. 7 shows an electrically conductive element of the camera device of FIG. 2 according to a further embodiment.

FIG. 6 shows another embodiment of an electrically conductive element 23' in an uncompressed state. In the embodiment of FIG. 6, the gasket portion 26' comprises an elastomeric inner core 28 and an electrically conductive outer layer 29. Apart from that, the electrically conductive element 23' is identical to the electrically conductive element 23 of FIG. 5.

FIG. 7 shows another embodiment of an electrically conductive element 23" in an uncompressed state. The electrically conductive element 23" of FIG. 7 comprises an electrically conductive mounting portion 25" similar as the electrically conductive mounting portion 25 of FIG. 1. Furthermore, the electrically conductive element 23" comprises a spring element 30.

Figure 8:
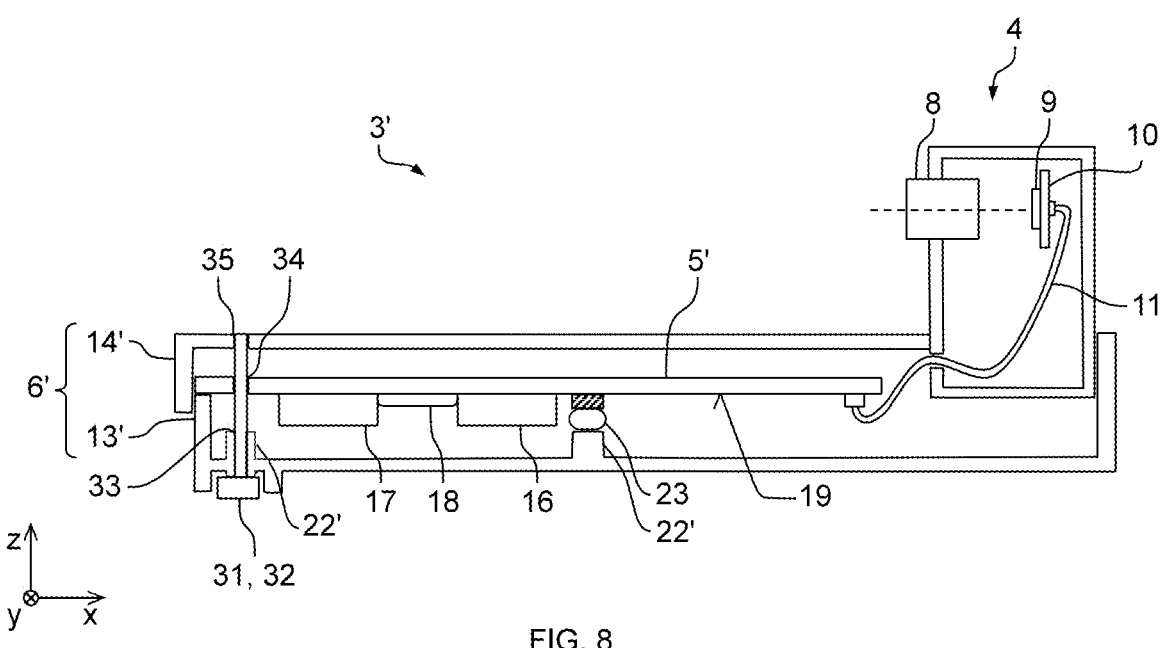
FIG. 8 shows, in a cross-section view, a camera device of the vehicle of FIG. 1 according to a second embodiment.

FIG. 8 shows a camera device 3' of the vehicle 1 of FIG. 1 according to a second embodiment. The camera device 3' of the second embodiment comprises one or more electrically conductive fastening elements 31 (e.g., screws 31) mechanically fixing the first and second parts 13', 14' of the electrically conductive housing 6' to each other. In the shown example, the camera device 3' comprises three screws 31 from which one is visible in the cross-section view of FIG. 8.

In the embodiment of FIG. 8, two of these three screws 31 are functioning as additional electrically conductive elements 32 for shielding the electronic components 16, 17, 18 from electromagnetic interference. For this purpose, a wall 22' of the first part 13' of the housing 6' comprises two through holes 33 (from which one is visible in the cross-section view of FIG. 8). The through holes 33 are extending perpendicularly to the main plane 15 (XY-plane) of the printed circuit board 5'. In other words, the through holes 33 are extending in the Z-direction in FIG. 8.

Although not shown in FIG. 8, the electrically conductive housing 6' according to the second embodiment may also comprise one or more protruding portions protruding from the first part 13' of the electrically conductive housing 6' towards the printed circuit board 5' such as the protruding portions A shown in FIG. 2.

Figure 9:
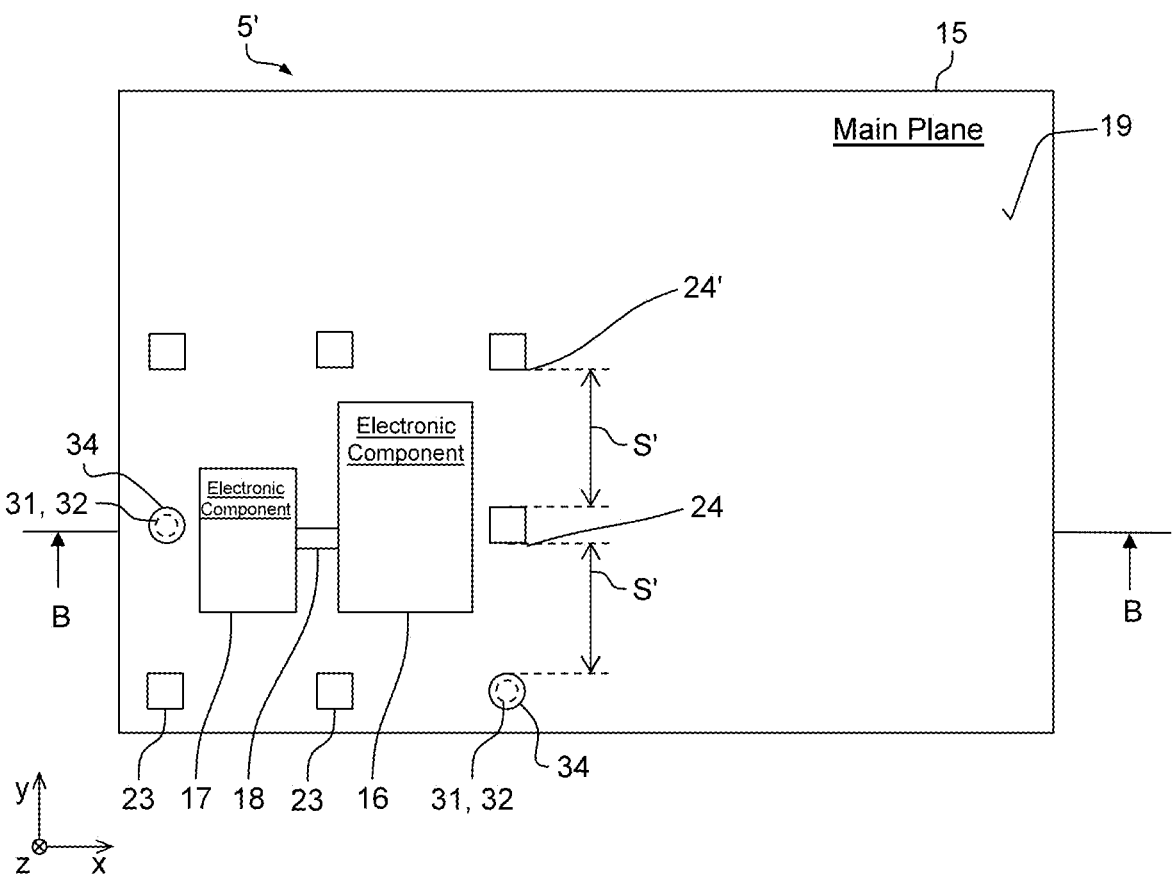
FIG. 9 shows a printed circuit board of the camera device of FIG. 8 in a bottom view.

FIG. 9 shows the printed circuit board 5' in a bottom view. The printed circuit board 5' comprises two through holes 34 (FIGS. 8 and 9) corresponding to the two through holes 33 of the wall 22' (FIG. 8). Furthermore, the second part 14' of the housing 5' comprises two corresponding openings 35 (FIG. 8) having, for example, a matching configuration (e.g., threads) for engaging the screws 31.

In this example, two screws 31 (FIG. 8) penetrate the corresponding two through holes 33 (FIG. 8) of the wall 22' of the first part 13' of the housing 6', penetrate the corresponding two through holes 34 (FIGS. 8 and 9) of the printed circuit board 5', electrically connect a ground potential (such as a ground trace, not shown) of the printed circuit board 5' and engage with the corresponding two openings 35 (FIG. 8) of the second part 14' of the housing. Thus, these two screws 31 can function as additional electrically conductive elements 32 for shielding the electronic components 16, 17, 18 from electromagnetic interference. As shown in FIG. 9, the two screws 31 inserted into the two openings 34 of the printed circuit board 5' can replace two of the electrically conductive elements 23. Hence, the electronic components 16, 17, 18 are surrounded in this example by six electrically conductive elements 23 and two screws 31. The gaps 24 between two neighboring ones of the electrically conductive elements 23 and screws 31 each have a size S' which is, for example, 0.5 cm. However, the size can also have a different value depending on the frequency range of the electromagnetic radiation that needs to be blocked from escaping or entering the fence build by the electrically conductive elements 23 and screws 31. As the two screws 31 are used in this embodiment as additional electrically conductive elements 32, a smaller number of electrically conductive elements 23 as SMT-components are required.

In other examples, also another number of fastening elements 31 (e.g., screws 31) can be function as additional electrically conductive elements 32.

FIG. 10 shows a flow chart of a method for manufacturing the camera device 3, 3' of FIG. 2 or 8.

In a first step S1 of the method, a printed circuit board 5, 5' is provided, the printed circuit board 5, 5' extends in a main plane 15.

In a second step S2 of the method, one or more electronic components 16, 17, 18 are mounted on a surface 19 of the printed circuit board 5, 5'.

In a third step S3 of the method, electrically conductive elements 23 are mounted on the surface 19 of the printed circuit board 5, 5' by a surface mounting technology (SMT) and such that they surround the one or more electronic components 16, 17, 18. The electrically conductive elements 23 are elastically deformable.

In a fourth step S4 of the method, an electrically conductive housing 6, 6' with a wall 22, 22' is provided. The wall 22, 22' is configured to extend, in the assembled state of the camera device 3, 3', perpendicularly to the main plane 15 of the printed circuit board 5, 5'.

In a fifth step S5 of the method, the printed circuit board 5, 5' is accommodated in the housing 6, 6' such that the wall 22, 22' of the housing 6, 6' is arranged on the electrically conductive elements 23 and the electrically conductive elements 23 are compressed between the wall 22, 22' and the printed circuit board 5, 5'.

In order to manufacture the camera device 3' according to the second embodiment (FIGS. 8 and 9), the method may further comprise a sixth step S6 of inserting a fastening element 31 into through holes 33 of the wall 22', through holes 34 of the printed circuit board 5' and engage them with corresponding openings 35 of the second part 14' of the housing 6'. Further, the fastening elements 31 are electrically connected with a ground trace (not shown) of the printed circuit board 5'.

Although the present invention has been described in accordance with preferred embodiments, it is obvious for the person skilled in the art that modifications are possible in all embodiments.

REFERENCE SIGNS 1 vehicle
2 window
3, 3' camera device
4 imaging module
5, 5' printed circuit board
6, 6' housing
7 housing
8, 8' optical system
9 image sensor unit
10 printed circuit board
11 electronic cable
12 connector
13 first part
14 second part
15 main plane
16 electronic component
17 electronic component
18 electronic component

11

19 surface
20 electronic component
21 EMI shield
22, 22' wall
23 electrically conductive element
24 gap
25, 25', 25'' mounting portion
26, 26' gasket portion
27 face side
28 inner core
29 outer layer
30 spring element
31 fastening element
32 additional electrically conductive element
33 through hole
34 through hole
35 opening
A protruding portion
O optical axis
S, S' size
The invention claimed is:

1. A camera device for a vehicle, the camera device comprising:
a printed circuit board extending in a main plane,
one or more electronic components mounted on a surface of the printed circuit board,
an electrically conductive housing accommodating the printed circuit board,
wherein the housing comprises an interior wall disposed inside an exterior wall of the housing and extending perpendicularly to the main plane of the printed circuit board and surrounding the one or more electronic components such that at least one of the one or more electronic components is disposed between the interior wall and the exterior wall of the housing,
wherein the housing comprises a first part with the interior wall and a second part,
wherein the interior wall comprises at least one through hole extending perpendicularly to the main plane of the printed circuit board, and
wherein the camera device comprises one or more electrically conductive fastening elements mechanically fixing the first and second parts of the housing to each other,
wherein at least one of the one or more fastening elements is disposed both in a corresponding one of the at least one through hole of the interior wall and a corresponding through hole of the printed circuit board, and
wherein the disposed fastening element functions as an additional electrically conductive element for shielding the one or more electronic components from electromagnetic interference; and
electrically conductive elements for shielding the one or more electronic components from electromagnetic interference,
wherein the electrically conductive elements are:
surface-mounted on the surface of the printed circuit board such that the electrically conductive elements surround the one or more electronic components, and
compressed elastically between the printed circuit board and a face side of the interior wall that faces the main plane of the printed circuit board.

2. The camera device according to claim 1, wherein at least one of the electrically conductive elements comprise:

12 an electrically conductive and elastically deformable gasket portion in contact with the interior wall, and
an electrically conductive mounting portion mounted on the surface of the printed circuit board.

3. The camera device according to claim 2, wherein the gasket portion comprises an elastomeric inner core and an electrically conductive outer layer.

4. The camera device according to claim 1, wherein at least one of the electrically conductive elements comprise:
a spring element in contact with the interior wall, and
an electrically conductive mounting portion mounted on the surface of the printed circuit board.

5. The camera device according to claim 1, comprising an imaging module for providing image data of a surrounding of the vehicle,
wherein the one or more electronic components comprise:
an image processor unit for processing the image data provided by the imaging module,
a memory unit for storing the image data, and
a communication bus for transferring the image data between the image processor unit and the memory unit.

6. The camera device according to claim 1, wherein the electrically conductive elements are arranged intermittent on the surface of the printed circuit board.

7. The camera device according to claim 6, wherein a size of a gap between each of two neighboring electrically conductive elements is 3 cm or smaller, and
wherein a size of a gap between each pair of an electrically conductive element and a neighboring additional electrically conductive element is 3 cm or smaller.

8. The camera device according to claim 1, wherein the total number of the electrically conductive elements surrounding the one or more electronic components is at least four, and
wherein the total number of the electrically conductive elements and the additional electrically conductive elements surrounding together the one or more electronic components is at least four.

9. A vehicle comprising the camera device according to claim 1.

10. A method for manufacturing a camera device for a vehicle the method comprising:
providing a printed circuit board extending in a main plane, mounting one or more electronic components on a surface of the printed circuit board;
mounting electrically conductive elements on the surface of the printed circuit board by a surface mounting technology and such that the electrically conductive elements surround the one or more electronic components;
providing an electrically conductive housing with an interior wall disposed inside an exterior wall of the housing and configured for extending, in the assembled state of the camera device, perpendicularly to the main plane of the printed circuit board,
wherein at least one of the one or more electronic components is disposed between the interior wall and the exterior wall of the housing,
wherein the housing comprises a first part and a second part,
wherein the first part comprises the interior wall,
wherein the interior wall comprises at least one through hole extending perpendicularly to the main plane of the printed circuit board, and wherein the camera device comprises of one or more electrically conductive fastening elements mechanically fixing the first and second parts of the housing to each other, wherein at least one of the one or more fastening elements is disposed both in a corresponding one of the at least one through hole of the interior wall and a corresponding through hole of the printed circuit board, and wherein the disposed fastening element functions as an additional electrically conductive element for shielding the one or more electronic components from electromagnetic interference; and accommodating the printed circuit board in the housing such that the interior wall of the housing is arranged on the electrically conductive elements and the electrically conductive elements are compressed elastically between the printed circuit board and a face side of the interior wall that faces the main plane of the printed circuit board.

\* \* \* \* \*